US012280592B2

(12) United States Patent
Kinoshita

(10) Patent No.: US 12,280,592 B2
(45) Date of Patent: Apr. 22, 2025

(54) PRINTING DEVICE

(71) Applicant: SEIKO EPSON CORPORATION, Tokyo (JP)

(72) Inventor: Ryohei Kinoshita, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 243 days.

(21) Appl. No.: 18/170,658

(22) Filed: Feb. 17, 2023

(65) Prior Publication Data

US 2023/0264493 A1 Aug. 24, 2023

(30) Foreign Application Priority Data

Feb. 18, 2022 (JP) ................................ 2022-024173

(51) Int. Cl.
*B41J 11/70* (2006.01)
*G03G 15/00* (2006.01)

(52) U.S. Cl.
CPC .......... *B41J 11/70* (2013.01); *G03G 15/6523* (2013.01)

(58) Field of Classification Search
CPC ....... B41J 11/70; G03G 15/6523; B26D 1/02; B26D 2001/0066; B26D 1/045
See application file for complete search history.

(56) References Cited

U.S. PATENT DOCUMENTS

2012/0219344 A1 8/2012 Kishi et al.

FOREIGN PATENT DOCUMENTS

| | | | | | |
|---|---|---|---|---|---|
| BR | 112013014408 | B1 | * | 12/2020 | ............. B26D 1/085 |
| JP | 09277189 | A | * | 10/1997 | ........... B26D 1/0006 |
| JP | 2009160663 | A | * | 7/2009 | ............... B26D 1/08 |
| JP | 2012240286 | A | | 12/2012 | |
| JP | 2020138239 | A | * | 9/2020 | ............. B65H 16/02 |

* cited by examiner

*Primary Examiner* — Justin Seo
(74) *Attorney, Agent, or Firm* — Harness, Dickey & Pierce, P.L.C.

(57) ABSTRACT

A printing device includes: a second blade; a first blade portion including a first blade and configured to cut print paper by moving from a standby position at which the first blade is away from the second blade, via an overlap start position at which the first blade starts overlapping the second blade on a side of the second blade in a first direction, to a cutting position; a first blade guide located in the first direction relative to the second blade and configured to guide movement of the first blade with the first blade between the first blade guide and the second blade when the first blade portion moves from the overlap start position to the cutting position; and a warping prevention portion configured to press the first blade in a second direction opposite to the first direction when the first blade portion moves from the overlap start position to the cutting position, to prevent the first blade from warping into a convex shape in the first direction or reduce such warping.

14 Claims, 14 Drawing Sheets

PRINTING DEVICE

The present application is based on, and claims priority from JP Application Serial Number 2022-024173, filed Feb. 18, 2022, the disclosure of which is hereby incorporated by reference herein in its entirety.

BACKGROUND

1. Technical Field

The present disclosure relates to printing devices.

2. Related Art

As disclosed in JP-A-2012-240286, printing devices including a cutter blade for cutting printed sheets have been known.

In a printing device including a second blade, a first blade that overlaps the second blade on a first direction side of the second blade, and a blade guide that guides the movement of the first blade between itself and the second blade, inclusion of the blade guide in the printing device causes a reaction force from the second blade to act in the first direction on the first blade. If the force in the first direction causes the first blade to warp into a convex shape, the first blade and the second blade do not rub against each other appropriately.

SUMMARY

A printing device of the present disclosure includes: a second blade; a first blade portion including a first blade and configured to cut a print medium by moving from a standby position at which the first blade is away from the second blade, via an overlap start position at which the first blade starts overlapping the second blade on a side of the second blade in a first direction, to a cutting position; a blade guide located in the first direction relative to the second blade and configured to guide movement of the first blade with the first blade between the blade guide and the second blade when the first blade portion moves from the overlap start position to the cutting position; and a warping prevention portion configured to press the first blade in a second direction opposite to the first direction when the first blade portion moves from the overlap start position to the cutting position, to prevent the first blade from warping into a convex shape in the first direction or reduce such warping.

DESCRIPTION OF EXEMPLARY EMBODIMENTS

Hereinafter, a printing device 1 which is an embodiment of a printing device will be described with reference to the attached drawings. The printing device 1 is a so-called mobile printer and has a portable size. Although the following description uses directions based on an XYZ Cartesian coordinate system indicated in each figure, these directions are merely for convenience of explanation and are not intended to limit the following embodiment in any way.

Figure 1:
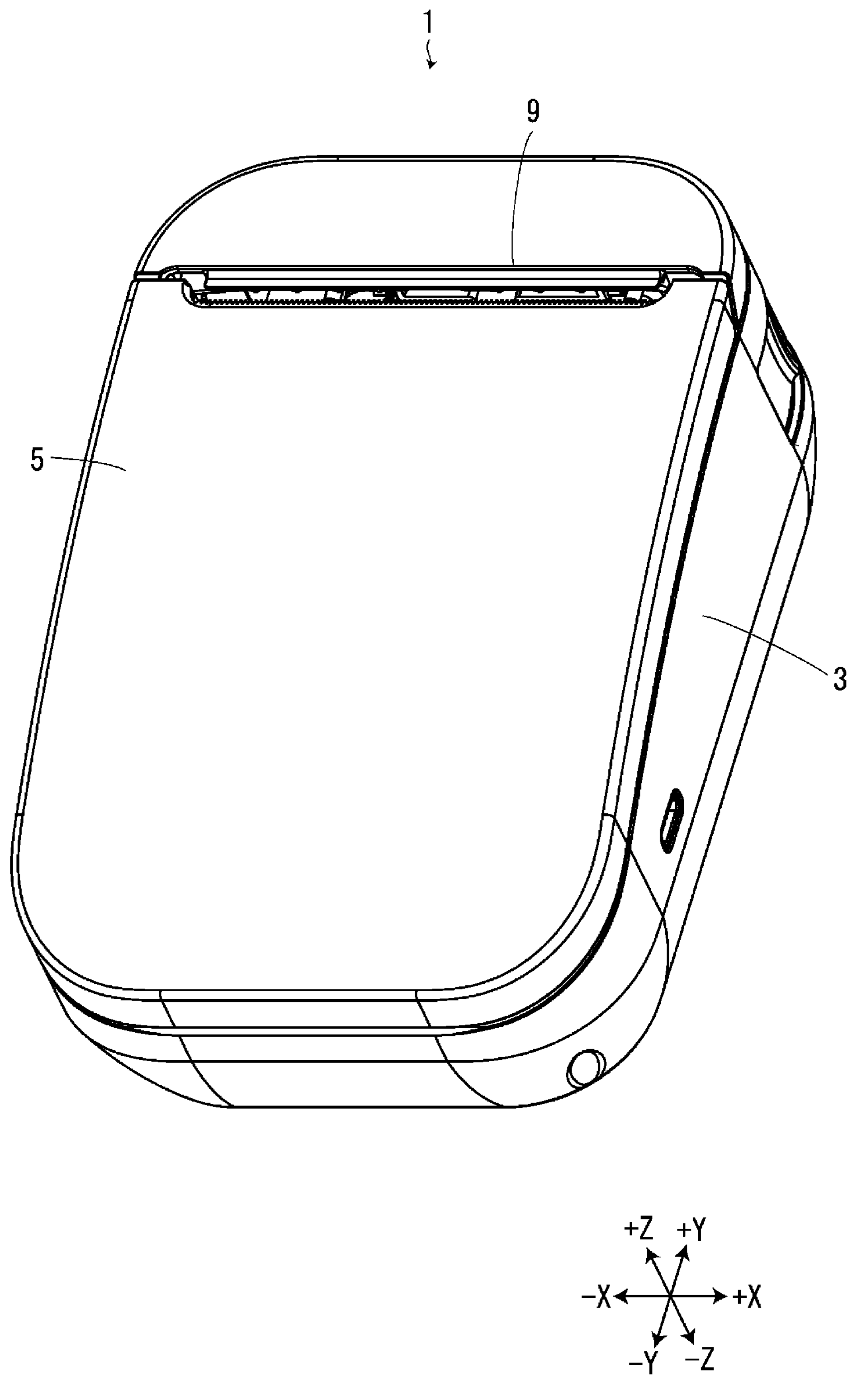
FIG. 1 is a perspective view of a printing device with an opening/closing cover closed.
Figure 2:
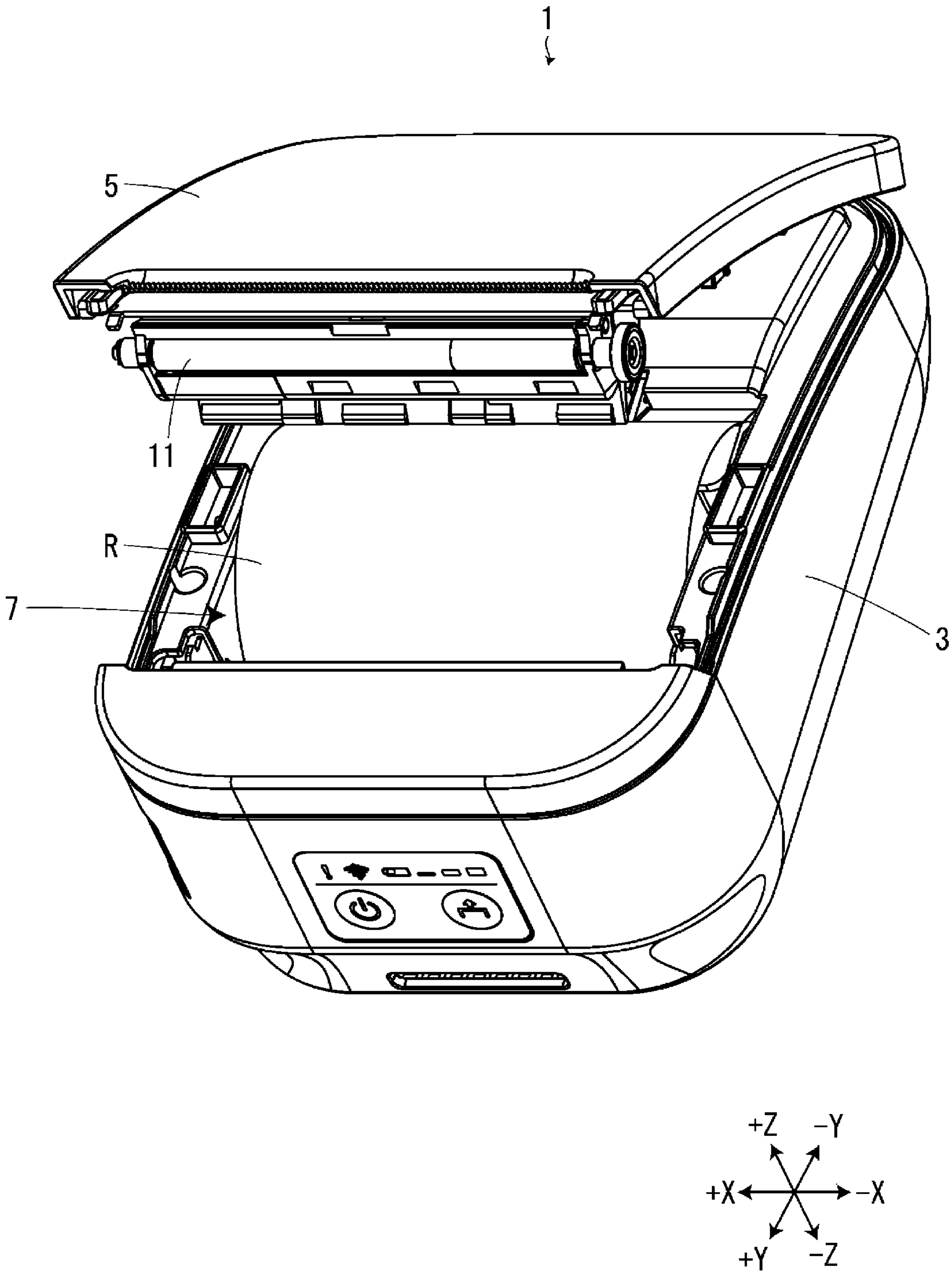
FIG. 2 is a perspective view of the printing device with the opening/closing cover open.

As illustrated in FIGS. 1 and 2, the printing device 1 has a substantially rectangular parallelepiped shape and includes a device case 3 and an opening/closing cover 5.

The device case 3 has a box shape having an open face in the +Z direction and contains a rolled-paper holder 7. The rolled-paper holder 7 houses rolled paper R formed of print paper P (see FIG. 3) serving as a print medium. The rolled paper R is placed in the rolled-paper holder 7 in a drop-in manner. The printing device 1 performs printing on the print paper P pulled from the rolled paper R housed in the rolled-paper holder 7.

The opening/closing cover 5 is for opening and closing the rolled-paper holder 7. The opening/closing cover 5 is attached at an end portion in the −Y direction of the device case 3 to be rotatable about an axis parallel to the X direction. A discharge opening 9 is present between the device case 3 and the distal end portion, in other words, the end portion in the +Y direction, of the opening/closing cover 5. The discharge opening 9 has a substantially rectangular shape elongated in the X direction.

Figure 3:
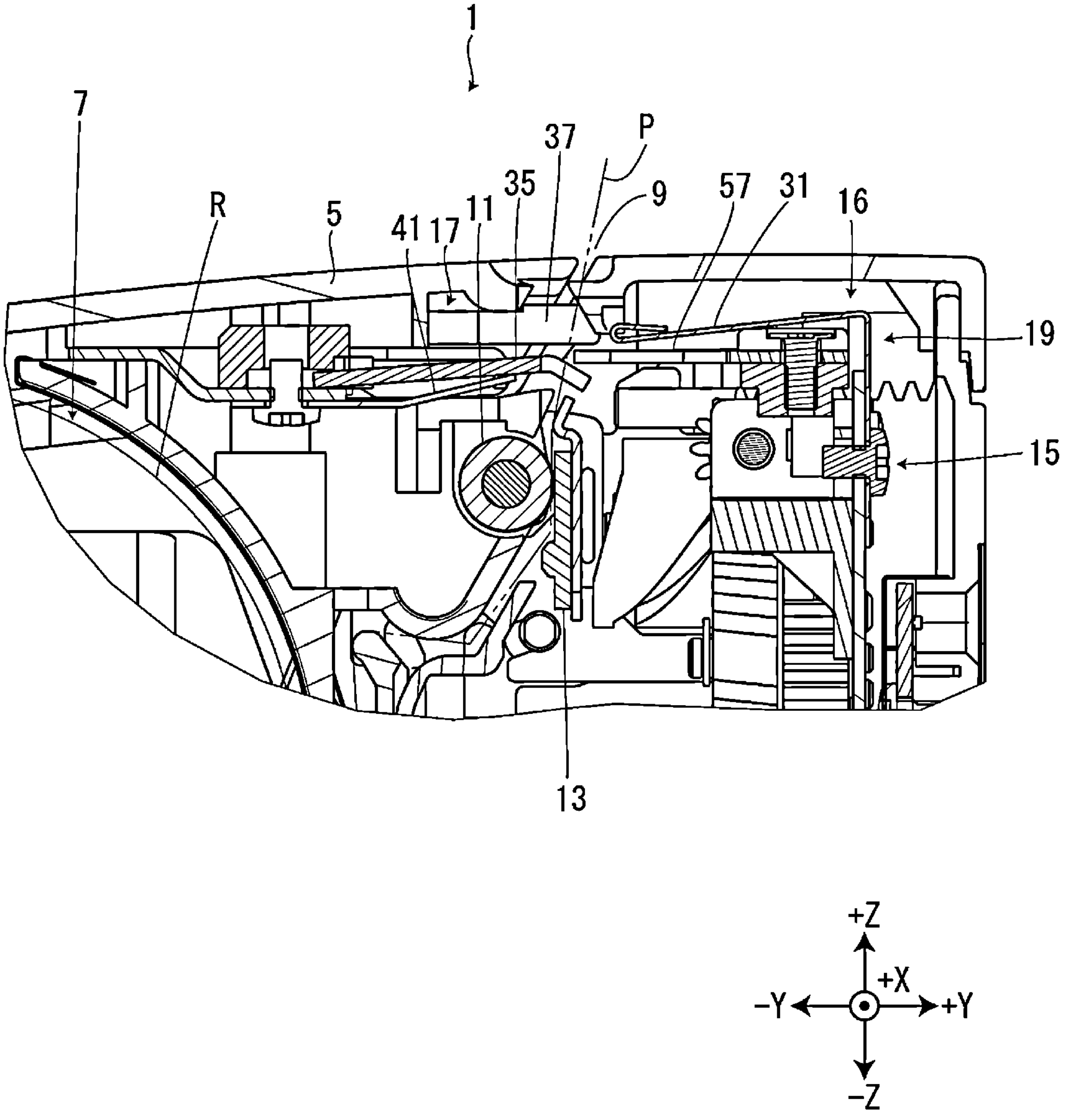
FIG. 3 is a partially enlarged cross-sectional view of the structure of a cutting section and the surroundings of the printing device.
Figure 4:
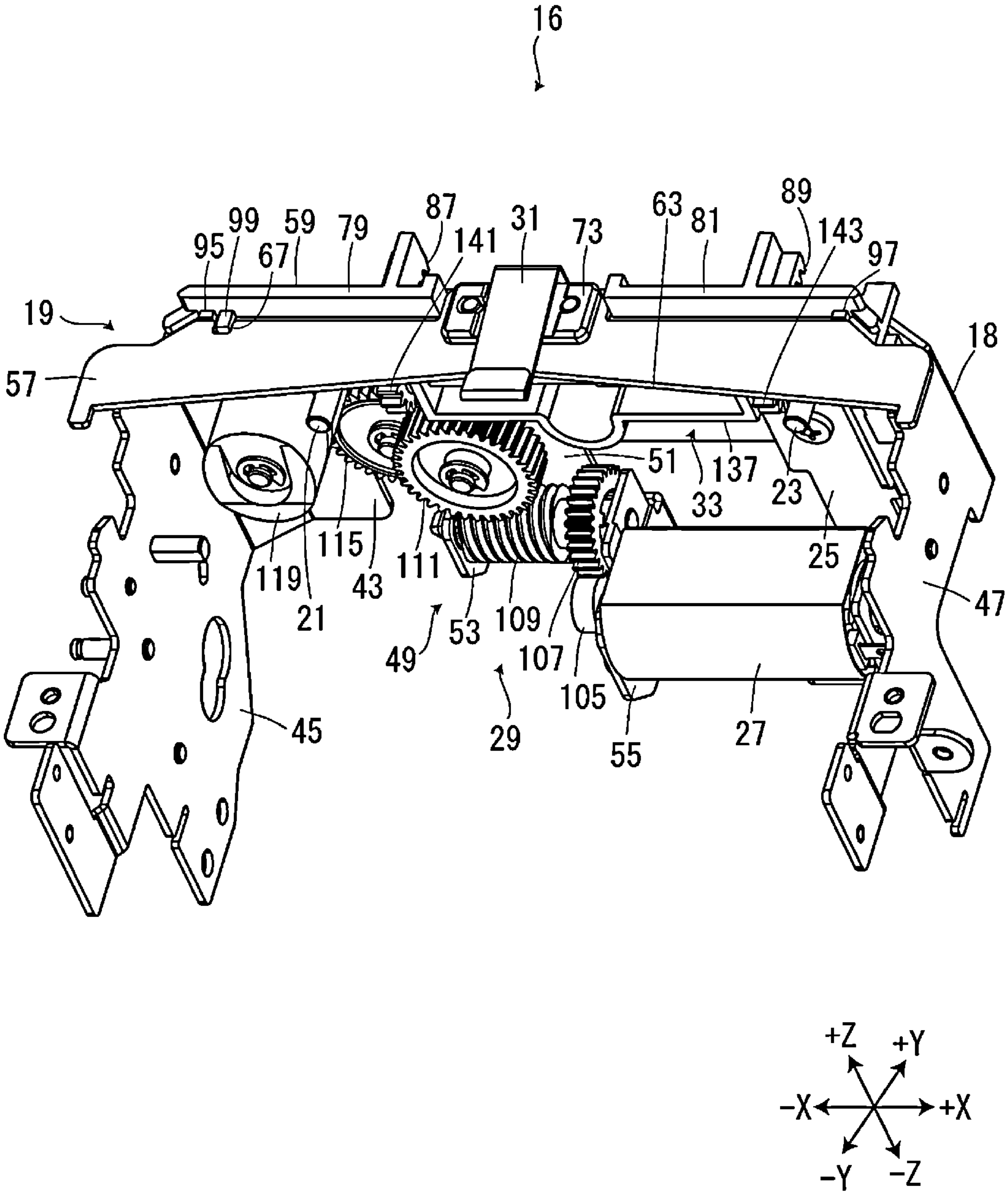
FIG. 4 is a perspective view of a first unit of the cutting section.
Figure 5:
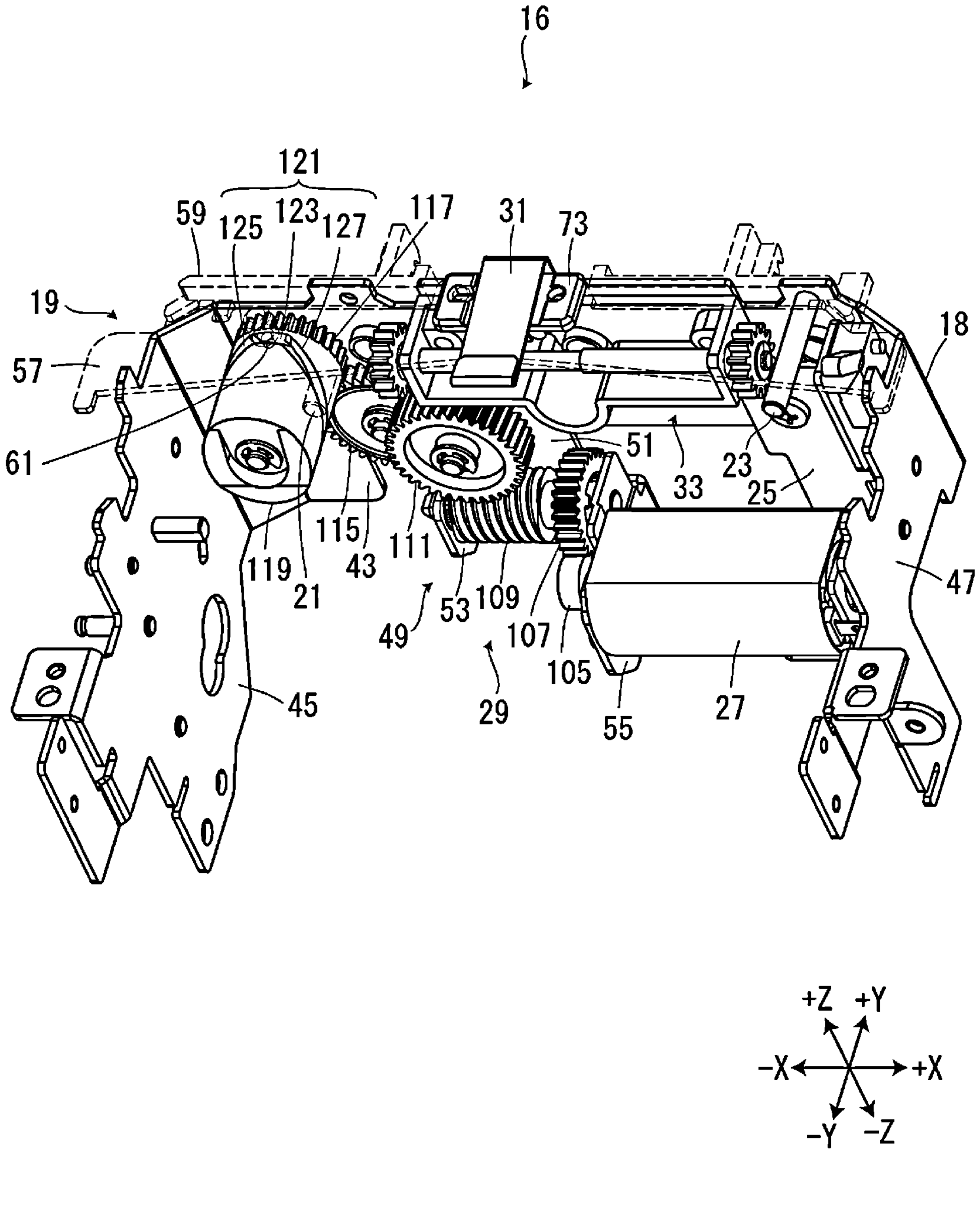
FIG. 5 is a diagram illustrating the perspective view of the first unit of the cutting section with a first blade portion illustrated to be transparent.

As illustrated in FIG. 3, the printing device 1 includes a platen roller 11, a thermal head 13, and a cutting section 15.

The platen roller 11 is provided beneath the opening/closing cover 5 such that its rotation axis is parallel to the X direction (see FIG. 2). The platen roller 11 nips the print paper P between itself and the thermal head 13, rotates by being driven by a feed motor (not illustrated) serving as a drive source, pulls the print paper P from the rolled paper R, and sends it toward the discharge opening 9.

The thermal head 13 is provided in the device case 3 so as to face the platen roller 11. The thermal head 13 includes a plurality of heat generating elements (not illustrated) and performs printing on the print paper P pulled from the rolled paper R.

The cutting section 15 cuts the print paper P in the width direction of the print paper P, in other words, the X direction between the position of the platen roller 11 and the thermal head 13 and the position of the discharge opening 9. The cutting section 15 includes a first unit 16 including a first blade 57 and a second unit 17 including a second blade 35. The first unit 16 is provided in the device case 3 at an end portion in the +Y direction. The second unit 17 is located in the −Y direction relative to the first unit 16 and beneath the opening/closing cover 5.

As illustrated in FIGS. 4 to 9, the first unit 16 of the cutting section 15 includes a cutter frame 18, a first blade portion 19, first and second holder guides 21 and 23, a motor support member 25, a drive motor 27, a power transmission portion 29, a warping prevention portion 31, and a rotation prevention portion 33.

The cutter frame 18 is provided in the device case 3 and supports the first blade portion 19, the first holder guide 21, the second holder guide 23, the motor support member 25, the drive motor 27, the power transmission portion 29, the warping prevention portion 31, and the rotation prevention portion 33. The cutter frame 18 includes a first frame portion 43, a second frame portion 45, a third frame portion 47, and a fourth frame portion 49.

The first frame portion 43 is formed to have a substantially rectangular plate shape parallel to the XZ plane. The second frame portion 45 extends in the −Y direction from an end portion in the −X direction of the first frame portion 43 and is formed to have a plate shape parallel to the YZ plane. The third frame portion 47 extends in the −Y direction from an end portion in the +X direction of the first frame portion 43 and is formed to have a plate shape parallel to the YZ plane.

The fourth frame portion 49 extends in the −Z direction substantially from the center portion in the X direction of the end portion in the −Z direction of the first frame portion 43. The fourth frame portion 49 includes a connection portion 51, a first gear support portion 53, and a second gear support portion 55. The connection portion 51 continues to the first frame portion 43 and connects the first gear support portion 53 and the second gear support portion 55. The first gear support portion 53 extends in the −Y direction from an end portion in the −X direction of the connection portion 51. The second gear support portion 55 extends in the −Y direction from an end portion in the +X direction of the connection portion 51.

Figure 11:
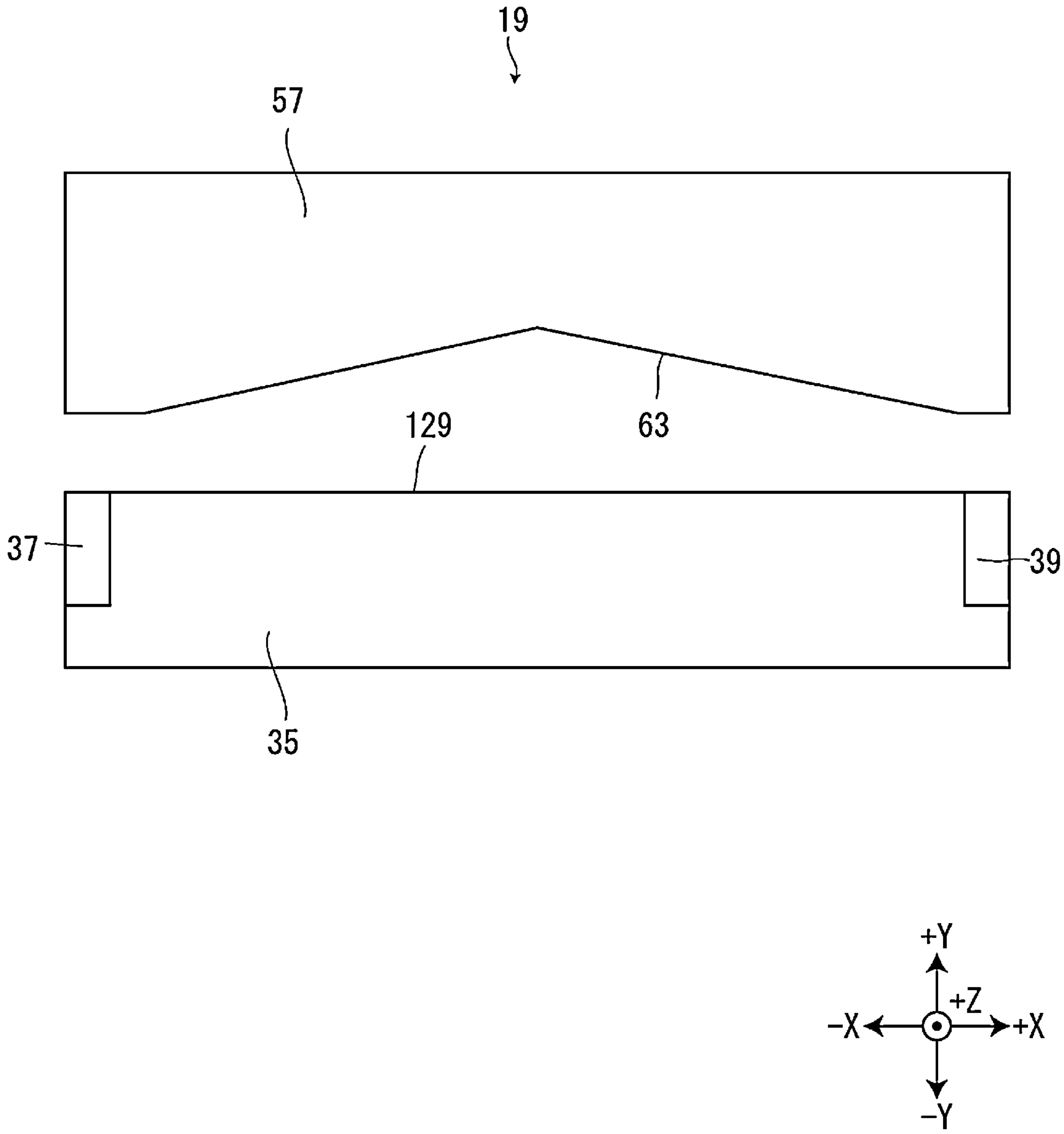
FIG. 11 is a diagram for explaining a standby position of the first blade portion.
Figure 12:
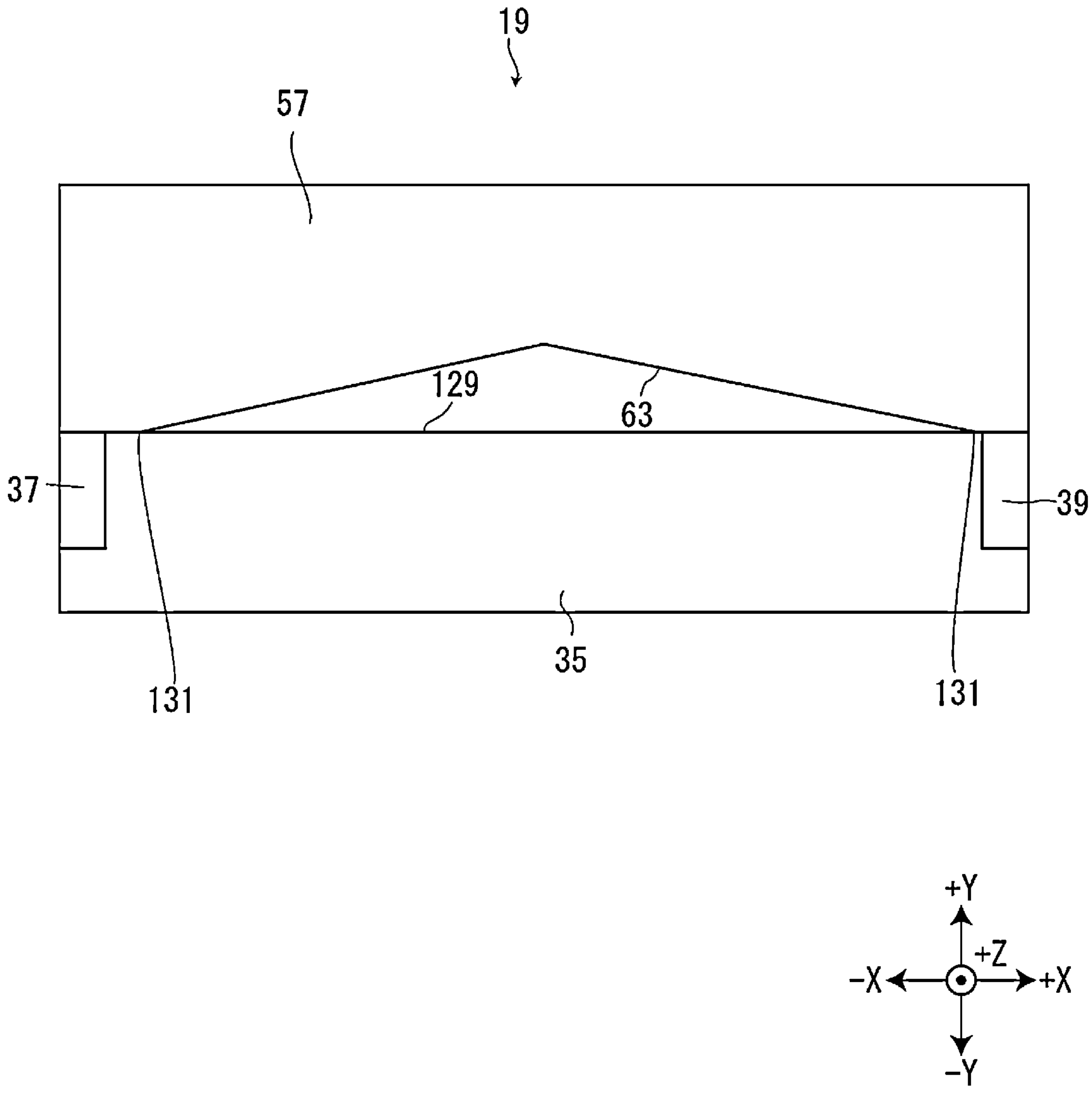
FIG. 12 is a diagram for explaining an overlap start position of the first blade portion.
Figure 13:
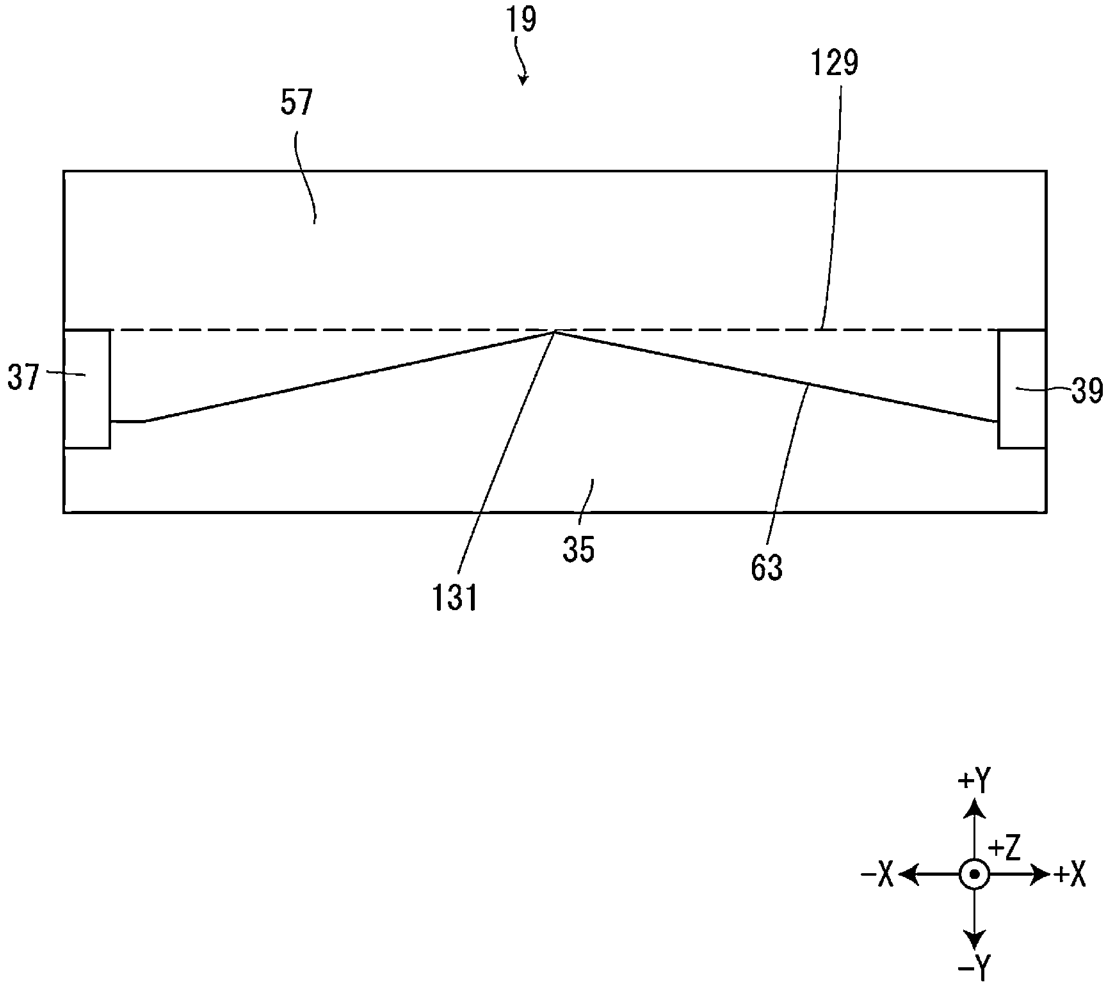
FIG. 13 is a diagram for explaining a cutting position of the first blade portion.

The first blade portion 19 is movable in the Y direction relative to the cutter frame 18. Specifically, the first blade portion 19 is configured to come into contact with and move away from the second blade 35. In the movement range of the first blade portion 19, the position at which the first blade portion 19 starts moving to the second blade 35 is referred to as a standby position of the first blade portion 19 (see FIG. 11). When the first blade portion 19 is at the standby position, the first blade 57 is away from the second blade 35. In the movement range of the first blade portion 19, the position of the first blade portion 19 at which the first blade 57 having started moving from the standby position starts overlapping the second blade 35 on the +Z direction side is referred to as an overlap start position of the first blade portion 19 (see FIG. 12). In the movement range of the first blade portion 19, the position at which the first blade portion 19 is closest to the second blade 35 is referred to as a cutting position of the first blade portion 19 (see FIG. 13). Note that the position of the first blade 57 at the time when the first blade portion 19 is at the standby position may also be referred to as the standby position of the first blade 57, the position of the first blade 57 at the time when the first blade portion 19 is at the overlap start position may also be referred to as the overlap start position of the first blade 57, and the position of the first blade 57 at the time when the first blade portion 19 is at the cutting position may also be referred to as the cutting position of the first blade 57.

When the first blade portion 19 is between the overlap start position and the cutting position, the first blade 57 and the second blade 35 overlap each other, and a first blade edge 63 and a second blade edge 129 rub against each other. The first blade portion 19 cuts the print paper P by moving from the standby position via the overlap start position to the cutting position. Note that the direction in which the first blade 57 is positioned relative to the second blade 35 when the first blade 57 overlaps the second blade 35 is referred to as the first direction. In the present embodiment, the +Z direction is the first direction.

The first blade portion 19 includes the first blade 57, a cutter holder 59, and a drive pin 61. The first blade 57 functions as a movable blade and cuts the print paper P with the second blade 35 which functions as a fixed blade. The first blade 57 has a substantially rectangular plate shape and has the first blade edge 63, which is substantially V-shaped, at the end portion in the −Y direction of the first blade 57. In other words, both end portions in the X direction of the first blade edge 63 are located closer to the second blade 35 than the center portion in the X direction of the first blade edge 63 (see FIG. 10). In addition, the first blade edge 63 has a recessed portion 65 (see FIG. 6) substantially at its center portion in the X direction. With this configuration, the print paper P, when cut, has a portion in the width direction of the print paper P that remains connected, and thus, the cut print paper P does not fall from the discharge opening 9 but rather remains at the discharge opening 9.

The first blade 57 has a positioning recess 67 near the end portion in the −X direction of the end portion in the +Y direction. The positioning recess 67 is engaged with a positioning protrusion 99 of the cutter holder 59. Since the positioning recess 67 is engaged with the positioning protrusion 99, the first blade 57 is positioned relative to the cutter holder 59.

Figure 8:
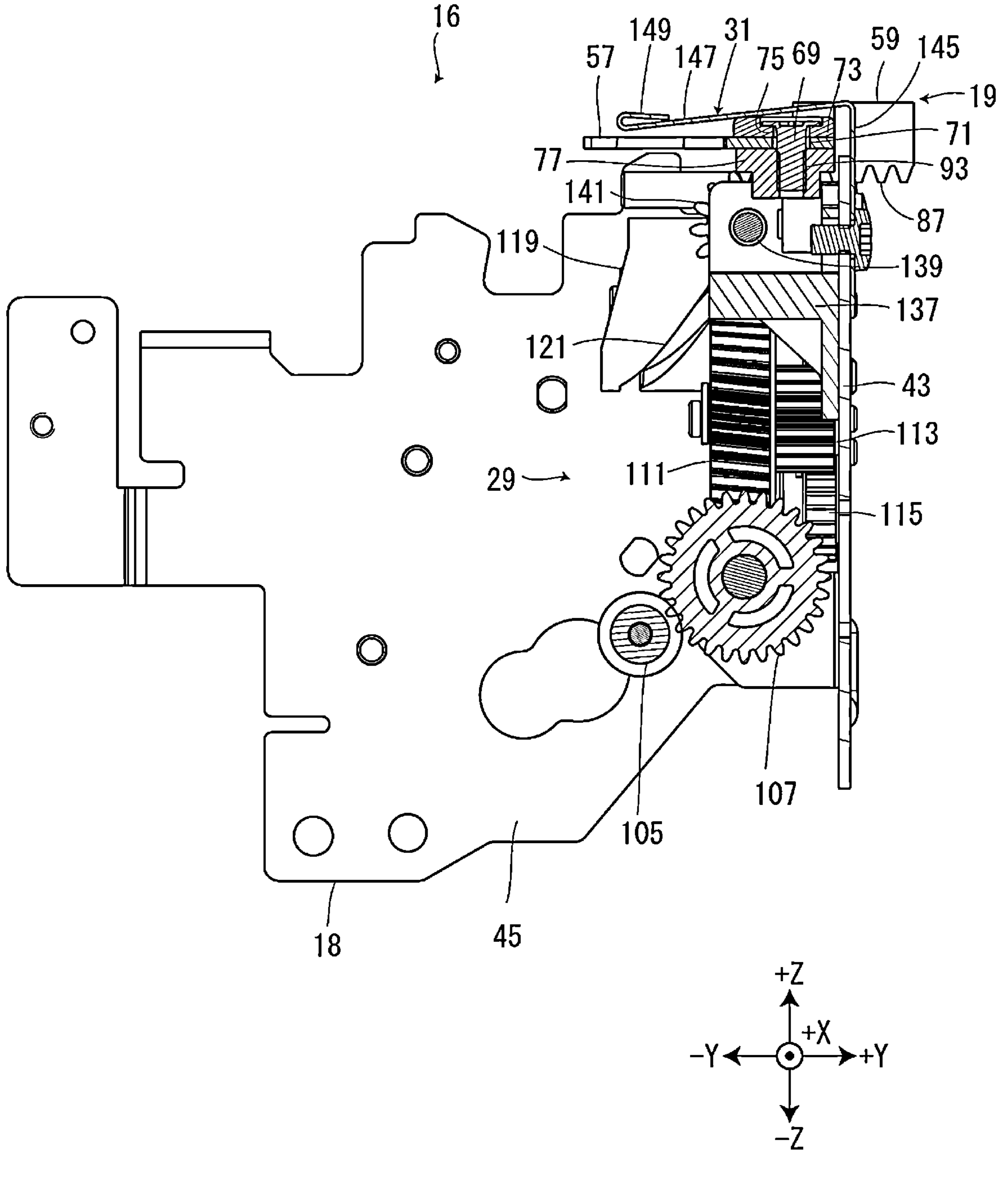
FIG. 8 is a cross-sectional view of the first unit of the cutting section taken along line VIII-VIII in FIG. 6.
Figure 9:
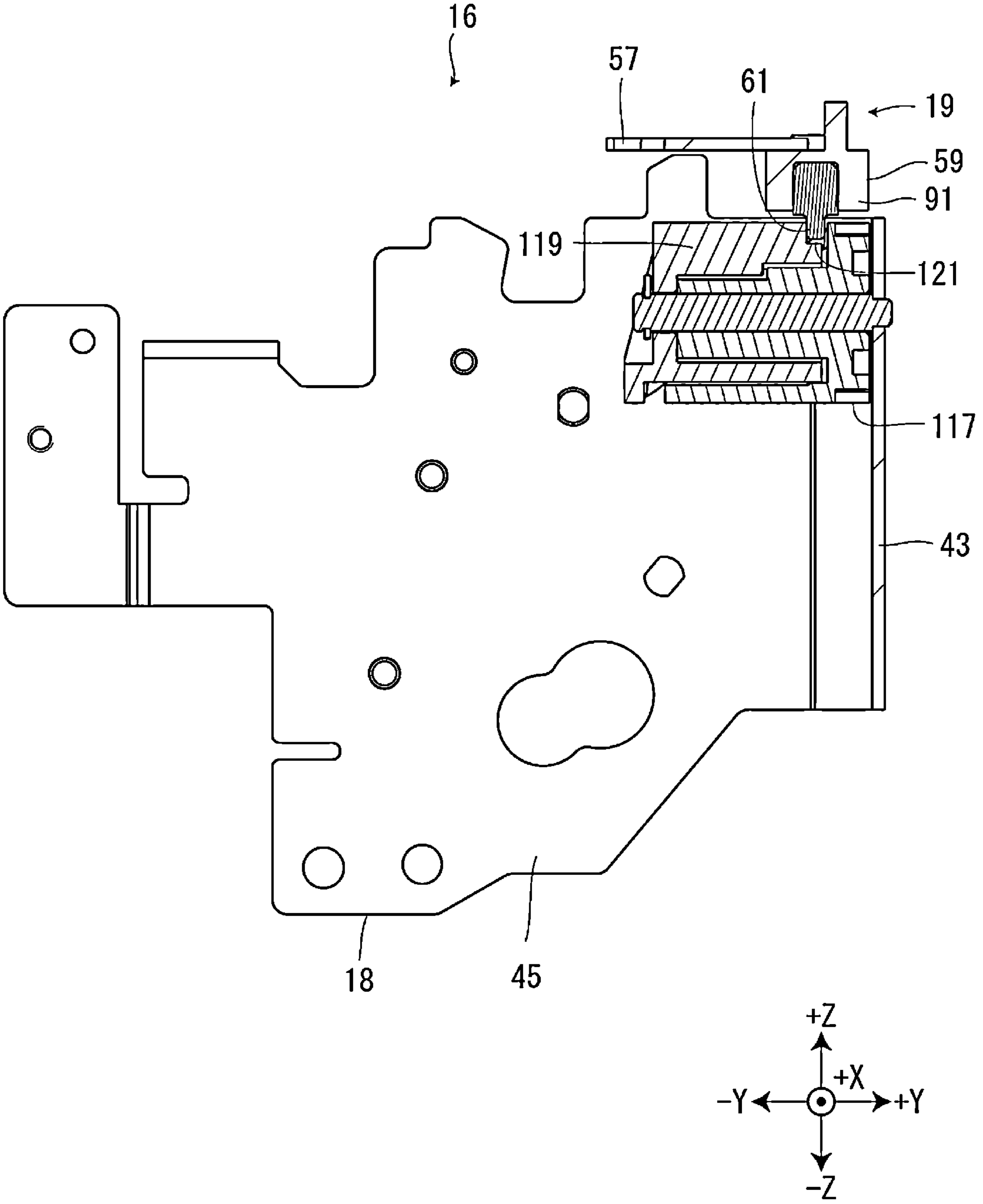
FIG. 9 is a cross-sectional view of the first unit of the cutting section taken along line IX-IX in FIG. 6.

The first blade 57 is fixed to the cutter holder 59 with a fixation screw 69 (see FIG. 8). The first blade 57 has a blade hole 71, into which the fixation screw 69 is inserted, substantially at its center portion in the X direction. A substantially rectangular plate-shaped fixation plate 73 is provided between the fixation screw 69 and the first blade 57. The fixation plate 73 has a plate hole 75 into which the fixation screw 69 is inserted. The plate hole 75 is counterbored.

Figure 6:
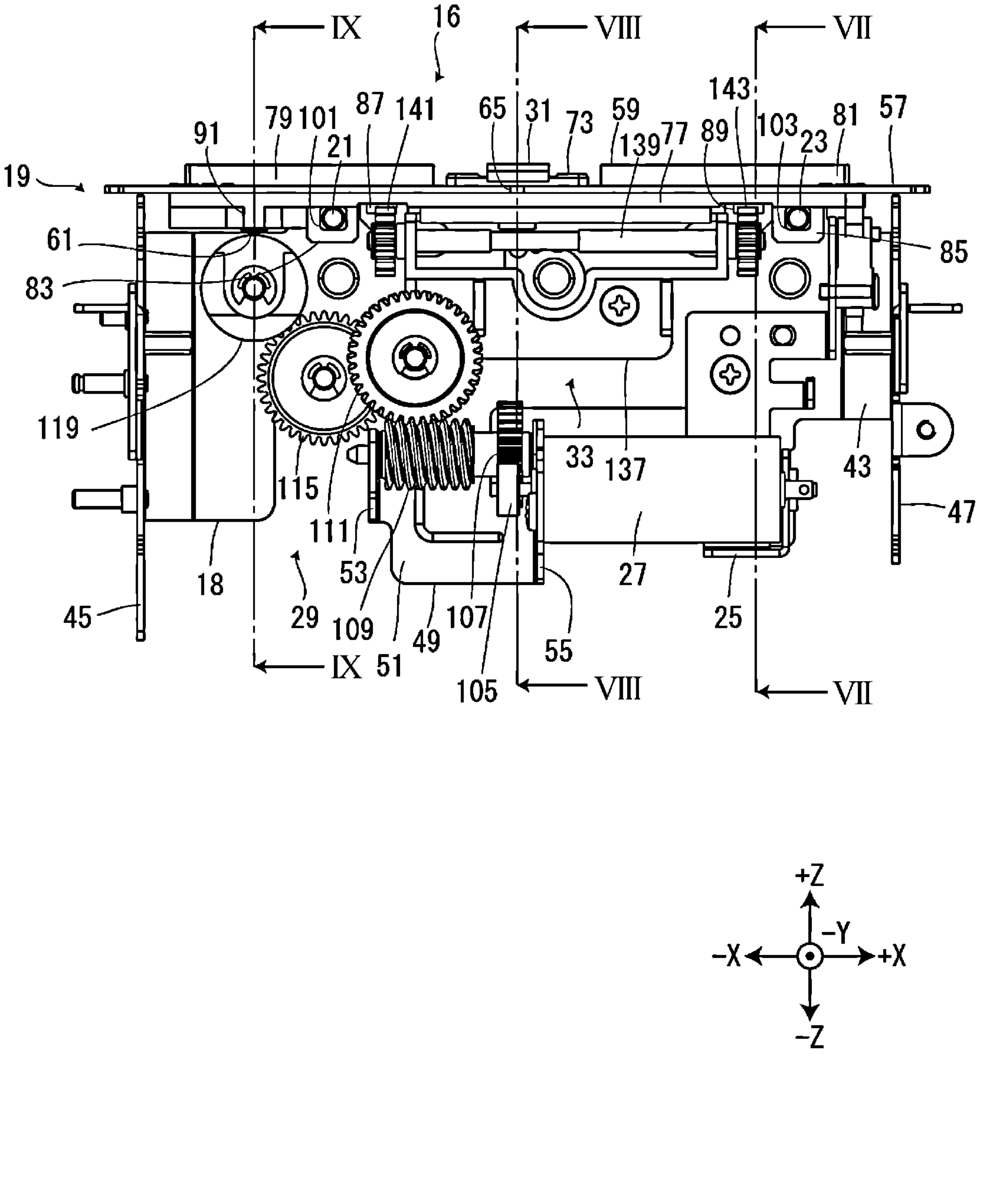
FIG. 6 is a view of the first unit of the cutting section from the −Y direction.
Figure 7:
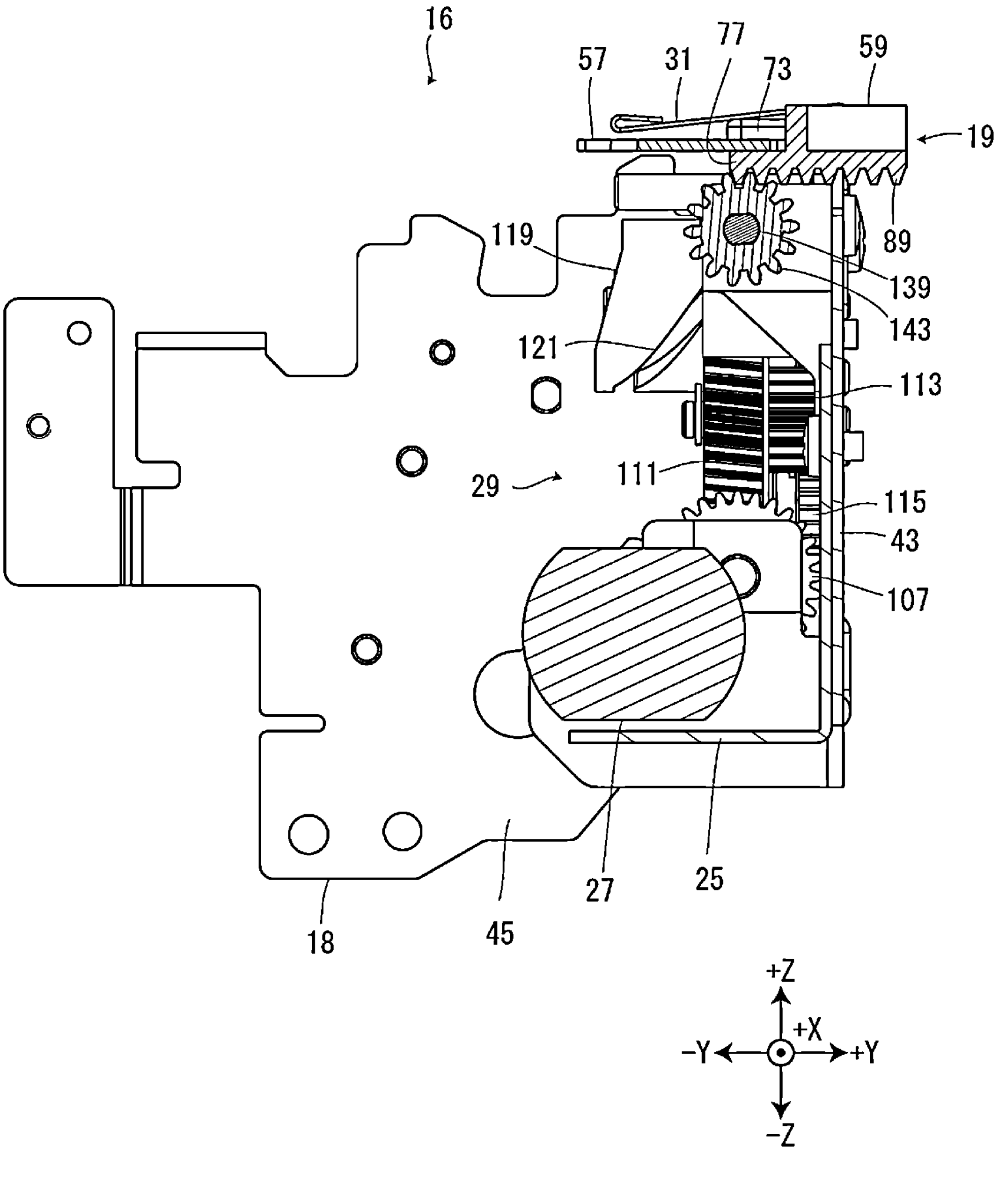
FIG. 7 is a cross-sectional view of the first unit of the cutting section taken along line VII-VII in FIG. 6.

The cutter holder 59 holds the first blade 57 and is movable in the Y direction relative to the cutter frame 18. As illustrated in FIG. 6, the cutter holder 59 includes a mounting portion 77, first and second holder protrusions 79 and 81, first and second guide engagement portions 83 and 85, first and second rack portions 87 and 89, and a drive protrusion 91.

The first blade 57 is mounted on the mounting portion 77. The mounting portion 77 has a holder hole 93 (see FIG. 8) substantially at its center portion in the X direction. The fixation screw 69 is fixed to the holder hole 93.

The first holder protrusion 79 and the second holder protrusion 81 protrude in the +Z direction from end portions in the +Y direction of the mounting portion 77 and are away from each other in the X direction. The second holder protrusion 81 is located in the +X direction relative to the first holder protrusion 79. From the first holder protrusion 79, a first force applying portion 95 protrudes in the −Y direction. From the second holder protrusion 81, a second force applying portion 97 protrudes in the −Y direction. The first force applying portion 95 and the second force applying portion 97 are in contact with the end face in the +Y direction of the first blade 57 which corresponds to the back of the first blade 57. When the first blade portion 19 is moved to the cutting position, the first force applying portion 95 and the second force applying portion 97 cause the first blade 57 to apply a force against the second blade 35. In addition, from the first holder protrusion 79, the positioning protrusion 99 protrudes in the −Y direction. The positioning protrusion 99 is engaged with the positioning recess 67 of the first blade 57. Since the positioning protrusion 99 is engaged with the positioning recess 67, the first blade 57 is positioned relative to the cutter holder 59.

The first guide engagement portion 83 and the second guide engagement portion 85 are located on the surface in the −Z direction of the mounting portion 77 and away from each other in the X direction and protrude in the −Z direction from the mounting portion 77 (see FIG. 6). The second guide engagement portion 85 is located in the +X direction relative to the first guide engagement portion 83. The first guide engagement portion 83 has a first guide hole 101. The first guide hole 101 has a substantially rounded square shape and extends in the Y direction. The first holder guide 21 is inserted into the first guide hole 101. In other words, the first guide engagement portion 83 is engaged with the first holder guide 21. The second guide engagement portion 85 has a second guide hole 103. The second guide hole 103 has a substantially rounded square shape and extends in the Y direction. The second holder guide 23 is inserted into the second guide hole 103. In other words, the second guide engagement portion 85 is engaged with the second holder guide 23.

The first rack portion 87 and the second rack portion 89 are located between the first guide engagement portion 83 and the second guide engagement portion 85 and away from each other in the X direction. The second rack portion 89 is located in the +X direction relative to the first rack portion 87. The first rack portion 87 extends in the Y direction, has protrusions and recesses on the surface in the −Z direction, and is engaged with a first pinion 141 described later. The second rack portion 89 extends in the Y direction, has protrusions and recesses on the surface in the −Z direction, and is engaged with a second pinion 143 described later (see FIG. 7).

The drive protrusion 91 is located in the −X direction relative to the first guide engagement portion 83 and protrudes in the −Z direction from the mounting portion 77. The drive pin 61 protrudes in the −Z direction from the surface in the −Z direction of the drive protrusion 91.

The drive pin 61 is provided on the drive protrusion 91. The drive pin 61 is substantially columnar and engaged with a drive groove 121 provided in a drive cam 119 described later (see FIGS. 5 and 9). Note that since the first blade 57 is provided with the drive pin 61 via the cutter holder 59, the configuration may also be expressed in such a way that the first blade 57 is provided with the drive pin 61.

The first holder guide 21 and the second holder guide 23 guide the movement of the cutter holder 59 in the Y direction. Specifically, the first holder guide 21 and the second holder guide 23 guide the movement of the first blade portion 19 between the standby position and the cutting position. The first holder guide 21 and the second holder guide 23 are provided on the first frame portion 43 and away from each other in the X direction. The second holder guide 23 is located in the +X direction relative to the first holder guide 21. The first holder guide 21 and the second holder guide 23 are substantially columnar and protrude in the −Y direction from the first frame portion 43. The first holder guide 21 is inserted into the first guide hole 101. The second holder guide 23 is inserted into the second guide hole 103.

Note that the first holder guide 21 has a substantially columnar shape, while the first guide hole 101 has a rounded square shape, and a gap, in other words, play between the first holder guide 21 and the first guide hole 101, is present. Similarly, the second holder guide 23 has a substantially columnar shape, while the second guide hole 103 has a rounded square shape, and a gap, in other words, play between the second holder guide 23 and the second guide hole 103, is present. This configuration prevents or reduces sticking between the first holder guide 21 and the first guide hole 101 and between the second holder guide 23 and the second guide hole 103, and thus the cutter holder 59 can move smoothly in the Y direction.

The motor support member 25 is attached to the first frame portion 43 of the cutter frame 18. The motor support member 25 supports the drive motor 27.

The drive motor 27 is supported by the motor support member 25. The drive motor 27 is a drive source of the first blade portion 19. The shaft of the drive motor 27 is provided with an output gear 105. The rotation axis of the output gear 105 is parallel to the X direction.

The power transmission portion 29 transmits the power of the drive motor 27 to the first blade portion 19. The power transmission portion 29 includes a first gear 107, a worm 109, a worm wheel 111, a second gear 113 (see FIG. 7), a third gear 115, a fourth gear 117 (see FIG. 5), and the drive cam 119.

The first gear 107 and the worm 109 are rotatably supported between the first gear support portion 53 and the second gear support portion 55 such that their rotation axes are parallel to the X direction. The first gear 107 is engaged with the output gear 105. The worm 109 is coaxial with the first gear 107 and rotates together with the first gear 107.

The worm wheel 111, the second gear 113, the third gear 115, the fourth gear 117, and the drive cam 119 are rotatably provided on the first frame portion 43 such that their rotation axes are parallel to the Y direction. The worm wheel 111 is engaged with the worm 109. The second gear 113 is coaxial with the worm wheel 111 and rotates together with the worm wheel 111 (see FIG. 7). The third gear 115 is located between the second gear 113 and the fourth gear 117 and engaged with the second gear 113 and the fourth gear 117. The third gear 115 transmits the rotation of the second gear 113 to the fourth gear 117. The fourth gear 117 is engaged with the third gear 115. The drive cam 119 is coaxial with the fourth gear 117 and rotates together with the fourth gear 117 (see FIG. 5).

As described above, the rotation of the drive motor 27 is transmitted to the drive cam 119 via the first gear 107, the worm 109, the worm wheel 111, the second gear 113, the third gear 115, and the fourth gear 117. In other words, the drive motor 27 rotates the drive cam 119 via the first gear 107, the worm 109, the worm wheel 111, the second gear 113, the third gear 115, and the fourth gear 117.

The drive cam 119 is substantially cylindrical. The drive cam 119 is located in the −Z direction relative to the drive pin 61. The drive groove 121 is in the side surface, in other words, the outer peripheral surface, of the drive cam 119. The drive groove 121 is engaged with the drive pin 61. The drive groove 121 has an annular shape in the circumferential direction of the drive cam 119, specifically, a substantially elliptical shape inclined in the Y direction, and has an orthogonal portion 123, a first drive groove portion 125, and a second drive groove portion 127 (see FIG. 5).

The orthogonal portion 123 is located at an end portion in the +Y direction in the outer peripheral surface of the drive cam 119 and extends in a direction, specifically, the X direction, orthogonal to the Y direction which is the movement direction of the first blade portion 19. The end portion in the −X direction of the orthogonal portion 123 continues to the first drive groove portion 125, and the end portion in the +X direction of the orthogonal portion 123 continues to the second drive groove portion 127. The first drive groove portion 125 is oblique relative to the Y direction which is the movement direction of the first blade portion 19. The second drive groove portion 127 is oblique relative to the Y direction which is the movement direction of the first blade portion 19. Note that in the drive groove 121, the first drive groove portion 125 corresponds to the range of substantially half the circumference from the end portion in the −X direction of the orthogonal portion 123 to the end portion in the −Y direction of the drive groove 121. In the drive groove 121, the second drive groove portion 127 corresponds to the range of substantially half the circumference from the end portion in the +X direction of the orthogonal portion 123 to the end portion in the −Y direction of the drive groove 121.

In the state in which the drive pin 61 is engaged with the orthogonal portion 123, the first blade portion 19 is at the standby position. In this state, the orthogonal portion 123 prevents or reduces movement in the Y direction of the drive pin 61. This configuration prevents or reduces movement in the Y direction of the first blade portion 19, even when the printing device 1 receives a mechanical shock.

When the drive cam 119 rotates in a first rotation direction, specifically, clockwise as viewed from the −Y direction, from the state in which the drive pin 61 is engaged with the orthogonal portion 123, the drive pin 61 moves relatively from the orthogonal portion 123 to the first drive groove portion 125. When the drive cam 119 rotates in the first rotation direction in the state in which the drive pin 61 is engaged with the first drive groove portion 125, the first drive groove portion 125 guides the drive pin 61 in the −Y direction. With this operation, the first blade portion 19 moves from the standby position via the overlap start position to the cutting position. Note that the configuration may also be expressed in such a way that when the drive cam 119 rotates in the first rotation direction in the state in which the drive pin 61 is engaged with the first drive groove portion 125, the first blade 57 moves from the standby position via the overlap start position to the cutting position.

When the drive cam 119 further rotates in the first rotation direction from the state in which the drive pin 61 is engaged with the first drive groove portion 125, the drive pin 61 moves relatively from the first drive groove portion 125 to the second drive groove portion 127. When the drive cam 119 rotates in the first rotation direction in the state in which the drive pin 61 is engaged with the second drive groove portion 127, the second drive groove portion 127 guides the drive pin 61 in the +Y direction. With this operation, the first blade portion 19 returns from the cutting position via the overlap start position to the standby position. Note that the configuration may also be expressed in such a way that when the drive cam 119 rotates in the first rotation direction in the state in which the drive pin 61 is engaged with the second drive groove portion 127, the first blade 57 returns from the cutting position via the overlap start position to the standby position.

As described above, the drive pin 61 engaged with the drive groove 121 in the drive cam 119 serves as a drive point. When the drive cam 119 rotates, the drive pin 61 moves in the Y direction, and the first blade portion 19 provided with the drive pin 61 moves between the standby position and the cutting position. Since this configuration makes the load that the first blade 57 receives from the drive pin 61 via the cutter holder 59 uniform in the X direction, it is not necessary to have two drive points at two positions symmetrical with respect to the center portion in the X direction of the first blade 57. Thus, it is not necessary to have two or more parts such as gears engaged with drive points, and one part, which is the drive cam 119, is sufficient for this operation. This makes it possible to downsize the printing device 1.

Figure 10:
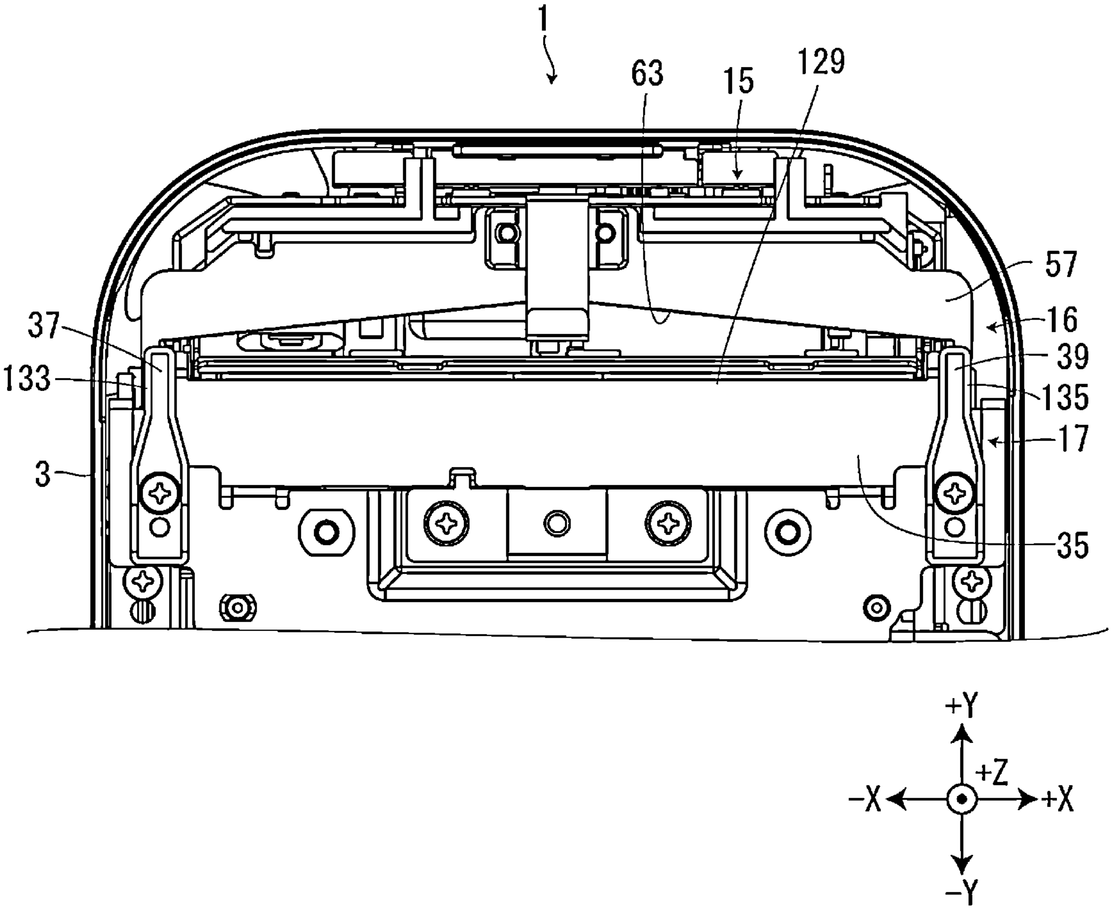
FIG. 10 is a view of the first unit and the second unit of the cutting section from the +Z direction.

As illustrated in FIG. 10, the second unit 17 of the cutting section 15 includes the second blade 35, first and second blade guides 37 and 39, and a cutter spring 41 (see FIG. 3). The second blade 35 functions as a fixed blade and cuts the print paper P with the first blade 57 that functions as a movable blade. The second blade 35 has a substantially rectangular plate shape and has the second blade edge 129 extending in the X direction at its end portion in the +Y direction. Note that the direction in which the second blade edge 129 extends is referred to as a third direction. In the present embodiment, the X direction is the third direction.

The cutter spring 41 applies a force in the +Z direction to the second blade 35 so that the first blade 57 and the second blade 35 rub against each other to an appropriate degree. The cutter spring 41 may be, for example, a leaf spring.

The first blade guide 37 and the second blade guide 39 are away from each other in the X direction and located in the first direction, in other words, the +Z direction relative to the second blade 35. Specifically, the first blade guide 37 and the second blade guide 39 are located between the second blade 35 and the opening/closing cover 5 (see FIG. 3). The second blade guide 39 is located in the +X direction relative to the first blade guide 37. When the first blade portion 19 moves from the overlap start position to the cutting position, the first blade guide 37 and the second blade guide 39 come into contact with the first blade 57 at both end portions of the first blade 57 in the third direction, in other words, the X direction, and press the first blade 57 in a second direction opposite to the first direction, in other words, in the −Z direction. Specifically, the first blade guide 37 presses the first blade 57 in the second direction at an end portion in the −X direction of the first blade 57. The second blade guide 39 presses the first blade 57 in the second direction at an end portion in in the +X direction of the first blade 57.

As described above, when the first blade portion 19 moves from the overlap start position to the cutting position, the first blade guide 37 and the second blade guide 39 guide the movement of the first blade 57 between themselves and the second blade 35. Since the first blade guide 37 and the second blade guide 39 guide the movement of the first blade 57, it is possible to prevent the first blade 57 from moving away from the second blade 35 in the first direction or reduce such movement, and this makes the first blade 57 and the second blade 35 rub against each other appropriately.

Here, when the first blade portion 19 moves from the overlap start position to the cutting position, as described above, the first blade 57 overlaps the second blade 35 on the first direction side of the second blade 35, and the first blade guide 37 and the second blade guide 39 press the first blade 57 toward the second blade 35 in the second direction. Thus, a force in the first direction acts on the first blade 57 as a reaction force from the second blade 35. This force in the first direction is referred to as a first reaction force F (see FIG. 14).

Figure 14:
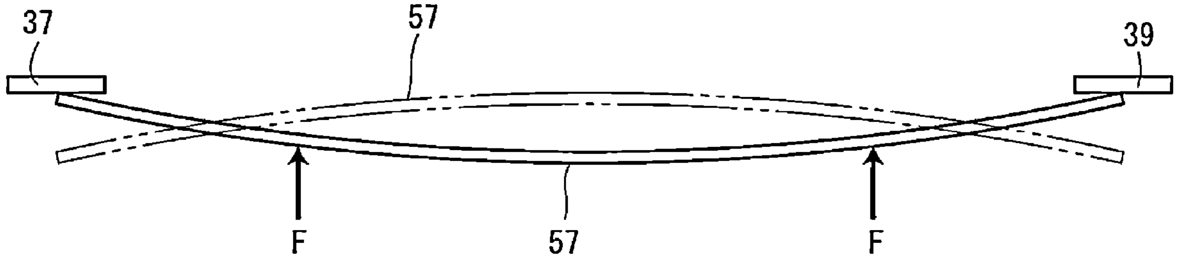
FIG. 14 is a diagram for explaining a warped shape and an inversely warped shape of the first blade portion.
Figure 14:
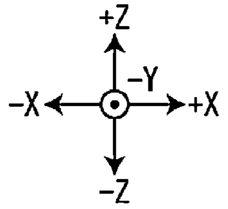

As indicated by solid lines in FIG. 14, when the first blade 57 has been warped into a convex shape in the direction opposite to the direction in which the first blade 57 is positioned when overlapping the second blade 35, specifically, in the second direction opposite to the first direction, the first blade 57 and the second blade 35 can rub favorably against each other. In contrast, when the first reaction force F acts on the first blade 57, there is a possibility that the first blade 57 can have an inversely warped shape, specifically, a convexly warped shape in the first direction, contrary to the ideal shape described above. When the first blade 57 has an inversely warped shape, it is impossible to make the first blade 57 and the second blade 35 rub against each other to an appropriate degree, and it is impossible to cut the print paper P appropriately. Note that FIG. 14 illustrates the first blade 57 having an inversely warped shape with dashed double-dotted lines.

In addition, since the first blade edge 63 of the first blade 57 is substantially V-shaped, when the first blade portion 19 moves from the overlap start position to the cutting position, the first blade edge 63 rubs against the second blade edge 129 from both end portions of the first blade edge 63 in the third direction, in other words, the X direction, toward the center portion in the third direction of the first blade edge 63. Specifically, when the first blade portion 19 is at the overlap start position, both end portions in the X direction of the first blade 57 and the second blade 35 are rubbing points 131 between the first blade 57 and the second blade 35 (see FIG. 12). When the first blade portion 19 is at the cutting position, the center portions in the X direction of the first blade 57 and the second blade 35 are the rubbing points 131 between the first blade 57 and the second blade 35 (see FIG. 13). As described above, when the first blade portion 19 moves from the overlap start position to the cutting position, the two rubbing points 131 gradually approach each other, and when the first blade portion 19 reaches the cutting position, the two rubbing points 131 substantially align with each other.

In this configuration, the distance between the rubbing point 131 in the −X direction and the first blade guide 37 and the distance between the rubbing point 131 in the +X direction and the second blade guide 39 are larger when the first blade portion 19 is at the cutting position than when the first blade portion 19 is at the overlap start position. Since the first reaction force F acts on these rubbing points 131, the moment of the first reaction force F is larger when the first blade portion 19 is at the cutting position than when the first blade portion 19 is at the overlap start position.

To address this, the cutting section 15 of the present embodiment includes the warping prevention portion 31. When the first blade portion 19 moves from the overlap start position to the cutting position, the warping prevention portion 31 presses the first blade 57 via the fixation plate 73 in the second direction opposite to the first direction, in other words, in the −Z direction, to prevent the first blade 57 from warping into a convex shape in the first direction or reduce such warping. This configuration enables the first blade 57 to retain the ideal shape described above, specifically, a convexly warped shape in the second direction. Thus, it is possible to make the first blade 57 and the second blade 35 rub against each other appropriately and to cut the print paper P favorably.

The warping prevention portion 31 may be, for example, an elastic member such as a leaf spring. The warping prevention portion 31 includes a fixed portion 145, a contact portion 147, and a folded portion 149 (see FIG. 8). The fixed portion 145 is a portion of the warping prevention portion 31 at an end portion in the +Y direction and fixed to the first frame portion 43. The contact portion 147 is a portion that bends at an end portion in the +Z direction of the warping prevention portion 31 and extends in the −Y direction and that is in contact with the fixation plate 73. The folded portion 149 is folded back at the end portion in the −Y direction of the contact portion 147 to be located on the +Z direction side.

The first blade portion 19 moves from the standby position to the cutting position against the elastic force of the warping prevention portion 31. When the first blade portion 19 comes close to the cutting position, the warping prevention portion 31 elastically deforms such that the bending angle of the contact portion 147 relative to the fixed portion 145 becomes smaller. Specifically, the amount of elastic deformation of the warping prevention portion 31 is larger when the first blade portion 19 is at the cutting position than when the first blade portion 19 is at the overlap start position. Thus, the force of the warping prevention portion 31 pressing the first blade 57 is larger when the first blade portion 19 is at the cutting position than when the first blade portion 19 is at the overlap start position. Thus, the warping prevention portion 31 can press the first blade 57 with a force according to the change in the moment of the first reaction force F. Note that the configuration may also be expressed in such a way that the amount of elastic deformation of the warping prevention portion 31 is larger when the first blade portion 19 is at the cutting position than when the first blade portion 19 is at the standby position. Alternatively, the configuration may also be expressed in such a way that the force of the warping prevention portion 31 pressing the first blade 57 is larger when the first blade portion 19 is at the cutting position than when the first blade portion 19 is at the standby position. Hence, the configuration may also be expressed in such a way that the force of the warping prevention portion 31 pressing the first blade 57 positioned at the cutting position is larger than the force of the warping prevention portion 31 pressing the first blade 57 positioned at the standby position, or that the force of the warping prevention portion 31 pressing the first blade 57 positioned at the cutting position is larger than the force of the warping prevention portion 31 pressing the first blade 57 positioned at the overlap start position.

Note that the first blade guide 37 has, at the peripheral edge portion of its face in the +Z direction, a first rib 133 (see FIG. 10) that protrudes in the first direction, in other words, in the +Z direction. Although the first blade guide 37 receives the first reaction force F from the second blade 35 via the first blade 57, the first blade guide 37 is reinforced against the first reaction force F by the first rib 133. Similarly, the second blade guide 39 has, at the peripheral edge portion of its face in the +Z direction, a second rib 135 (see FIG. 10) that protrudes in the first direction, in other words, in the +Z direction. Although the second blade guide 39 receives the first reaction force F from the second blade 35 via the first blade 57, the second blade guide 39 is reinforced against the first reaction force F by the second rib 135.

In addition, as described above, the first drive groove portion 125 is oblique to the Y direction which is the movement direction of the first blade portion 19. Hence, the force that the drive pin 61 receives from the first drive groove portion 125 includes a component force in the +X direction. This component force in the +X direction acts as a force to shift the cutter holder 59 by the amount of play until the inner periphery wall of the first guide hole 101 comes into contact with the first holder guide 21 or until the inner periphery wall of the second guide hole 103 comes into contact with the second holder guide 23. As a result, the cutter holder 59 rotates about the first holder guide 21 or about the second holder guide 23 in a plane parallel to the XY plane, and hence it can be impossible to make the first blade 57 and the second blade 35 rub against each other appropriately.

To address this, the cutting section 15 of the present embodiment includes the rotation prevention portion 33. As illustrated in FIG. 6, the rotation prevention portion 33 includes a pinion holder 137, a pinion shaft 139, the first pinion 141, and the second pinion 143. The pinion holder 137 is attached to the first frame portion 43 and rotatably supports the pinion shaft 139. The pinion shaft 139 extends in a direction orthogonal to the movement direction of the first blade portion 19, specifically, in the X direction. The first pinion 141 is fixed to an end portion in the −X direction of the pinion shaft 139, and the second pinion 143 is fixed to an end portion in in the +X direction of the pinion shaft 139. The first pinion 141 and the second pinion 143 rotate together.

The first pinion 141 is engaged with the first rack portion 87. The second pinion 143 is located in the +X direction relative to the first pinion 141 and engaged with the second rack portion 89. The first pinion 141 and the second pinion 143 rotate together being driven by the movement of the first blade portion 19 in the Y direction. As described above, the first pinion 141 and the second pinion 143 that rotate together are engaged with the first rack portion 87 and the second rack portion 89 at two positions away from each other in the X direction. Note that the configuration may also be expressed in such a way that the first pinion 141 and the second pinion 143 rotate together being driven by the movement of the first blade 57 in the Y direction.

This configuration allows the cutter holder 59 to move such that the first pinion 141 and the second pinion 143 rotate together, in other words, this configuration allows the cutter holder 59 to move in the Y direction. In contrast, this configuration prevents the cutter holder 59 from moving such that the first pinion 141 and the second pinion 143 rotate in different ways, in other words, this configuration prevents the cutter holder 59 from rotating in a plane parallel to the XY plane. Thus, even though the component force in the +X direction acts on the cutter holder 59, it is possible to prevent or reduce rotation of the cutter holder 59 in a plane parallel to the XY plane. Note that the configuration may also be expressed in such a way that the rotation prevention portion 33 prevents or reduces the rotation of the first blade portion 19 and the first blade 57, caused by the force in the X direction, in other words, the third direction.

As has been described above, the printing device 1 of the present embodiment includes the second blade 35, the first blade portion 19, the first and second blade guides 37 and 39, and the warping prevention portion 31. The first blade portion 19 includes the first blade 57 and cuts the print paper P by the first blade 57 moving from the standby position away from the second blade 35, via the overlap start position at which the first blade 57 starts overlapping the second blade 35 on the first direction side of the second blade 35, in other words, on the +Z direction side of the second blade 35, to the cutting position. The first blade guide 37 and the second blade guide 39 are located in the first direction relative to the second blade 35 and, when the first blade portion 19 moves from the overlap start position to the cutting position, guide the movement of the first blade 57 between themselves and the second blade 35. The warping prevention portion 31, when the first blade portion 19 moves from the overlap start position to the cutting position, presses the first blade 57 in the second direction opposite to the first direction, in other words, in the −Z direction, to prevent the first blade 57 from warping into a convex shape in the first direction or to reduce such warping.

Since this configuration includes the first blade guide 37 and the second blade guide 39, even though the first reaction force F in the first direction acts on the first blade 57, the warping prevention portion 31 can keep the first blade 57 in a convexly warped shape in the second direction, making it possible to make the first blade 57 and the second blade 35 rub against each other appropriately.

Other Modification Examples

The disclosure is not limited to the above embodiment, and it goes without saying that various configurations can be employed within a range not departing from the spirit. For example, the above embodiment, in addition to the foregoing one, may be changed into those described below. In addition, the embodiment and modification examples may be combined.

The warping prevention portion 31 may include an elastic member other than a leaf spring. For example, the warping prevention portion 31 may include a coil spring or rubber as an elastic member. The warping prevention portion 31 is not limited to the configurations including an elastic member. For example, the warping prevention portion 31 may be one that is located in the first direction relative to the second blade 35 and in sliding contact with the first blade 57 moving between the overlap start position and the cutting position and that presses the first blade 57 in the second direction.

The rotation prevention portion 33 is not limited to those including the first pinion 141 and the second pinion 143. For example, the configuration may be such that the gap between the first holder guide 21 and the first guide hole 101 and the gap between the second holder guide 23 and the second guide hole 103 are set to be small so that the first holder guide 21 and the second holder guide 23 can function as the rotation prevention portion 33.

The first blade portion 19 is not limited to those driven by a motor but may be ones operated manually.

The printing method of the printing device 1 is not limited to the thermal method but may be, for example, an ink jet method or an electrophotographic method.

Summary

The following is a summary of the printing device.

A printing device includes: a second blade; a first blade portion including a first blade and configured to cut a print medium by moving from a standby position at which the first blade is away from the second blade, via an overlap start position at which the first blade starts overlapping the second blade on a side of the second blade in a first direction, to a cutting position; a blade guide located in the first direction relative to the second blade and configured to guide movement of the first blade with the first blade between the blade guide and the second blade when the first blade portion moves from the overlap start position to the cutting position; and a warping prevention portion configured to press the first blade in a second direction opposite to the first direction when the first blade portion moves from the overlap start position to the cutting position, to prevent the first blade from warping into a convex shape in the first direction or reduce such warping.

Since this configuration includes the blade guide, even though the first reaction force in the first direction acts on the first blade from the second blade, the warping prevention portion can keep the first blade in a shape warped in the second direction, making it possible to make the first blade and the second blade rub against each other appropriately.

Note that the first blade guide 37 and the second blade guide 39 are examples of the blade guide. The +Z direction is an example of the first direction. The −Z direction is an example of the second direction.

In this case, the warping prevention portion may include an elastic member.

With this configuration, the elastic force of the elastic member can press the first blade in the second direction.

In this case, when the first blade portion moves from the overlap start position to the cutting position, the blade guide may press the first blade in the second direction at both end portions of the first blade in a third direction in which a second blade edge of the second blade extends; when the first blade portion moves from the overlap start position to the cutting position, a first blade edge of the first blade may rub against the second blade edge from both end portions of the first blade edge in the third direction toward a center portion of the first blade edge in the third direction; and the elastic member elastically may deform more when the first blade portion is at the cutting position than when the first blade portion is at the overlap start position.

With this configuration, the warping prevention portion can press the first blade with a force according to the change in the moment of the first reaction force received from the first blade.

Note that the X direction is an example of the third direction.

In this case, the blade guide may include a rib protruding in the first direction.

With this configuration, although the blade guide receives the first reaction force in the first direction from the second blade via the first blade, the blade guide can be reinforced against the first reaction force by the rib.

In this case, the first blade portion may include a drive pin, the printing device may include a tubular rotator and a drive motor configured to rotate the rotator, and a side surface of the rotator may have a drive groove engaged with the drive pin such that the first blade portion moves from the standby position to the cutting position when the rotator rotates.

With this configuration, it is not necessary to have two or more parts such as gears engaged with drive points, but one part, which is the drive cam, is enough for this operation. This makes it possible to downsize the printing device.

Note that the drive cam 119 is an example of the rotator.

In this case, the printing device may further include a rotation prevention portion including a first engagement portion engaged with the first blade portion and a second engagement portion located in a third direction in which a second blade edge of the second blade extends, relative to the first engagement portion and engaged with the first blade portion.

With this configuration, since the first blade portion is engaged with the first engagement portion and the second engagement portion at two points away from each other in the third direction, even though a force in the third direction acts on the first blade portion, it is possible to prevent or reduce rotation of the first blade portion.

In this case, the first engagement portion may include a first engagement gear, the second engagement portion may include a second engagement gear configured to rotate together with the first engagement gear, and the first engagement gear and the second engagement gear may rotate by being driven by movement of the first blade portion.

This configuration allows the first blade portion to move such that the first engagement gear and the second engagement gear rotate together and prevents the first blade portion from moving such that the first engagement gear and the second engagement gear rotate in different ways. With this configuration, even if a force in the third direction acts on the first blade portion, it is possible to prevent or reduce rotation of the first blade portion.

Note that the first pinion 141 is an example of the first engagement gear. The second pinion 143 is an example of the second engagement gear.

What is claimed is:

1. A printing device comprising:

a second blade;

a first blade portion including a first blade and configured to cut a print medium by moving from a standby position at which the first blade is away from the second blade, via an overlap start position at which the first blade starts overlapping the second blade on a side of the second blade in a first direction, to a cutting position;

a blade guide located in the first direction relative to the second blade and configured to guide movement of the first blade with the first blade between the blade guide and the second blade when the first blade portion moves from the overlap start position to the cutting position; and a warping prevention portion configured to press the first blade in a second direction opposite to the first direction when the first blade portion moves from the overlap start position to the cutting position, to prevent the first blade from warping into a convex shape in the first direction or reduce such warping.

2. The printing device according to claim 1, wherein the warping prevention portion includes an elastic member.

3. The printing device according to claim 2, wherein when the first blade portion moves from the overlap start position to the cutting position, the blade guide presses the first blade in the second direction at both end portions of the first blade in a third direction in which a second blade edge of the second blade extends, when the first blade portion moves from the overlap start position to the cutting position, a first blade edge of the first blade rubs against the second blade edge from both end portions of the first blade edge in the third direction toward a center portion of the first blade edge in the third direction, and the elastic member elastically deforms more when the first blade portion is at the cutting position than when the first blade portion is at the overlap start position.

4. The printing device according to claim 1, wherein the blade guide includes a rib protruding in the first direction.

5. The printing device according claim 1, wherein the first blade portion includes a drive pin, the printing device includes a tubular rotator and a drive motor configured to rotate the rotator, and a side surface of the rotator has a drive groove engaged with the drive pin such that the first blade portion moves from the standby position to the cutting position when the rotator rotates.

6. The printing device according claim 5, further comprising a rotation prevention portion including a first engagement portion engaged with the first blade portion and a second engagement portion located in a third direction in which a second blade edge of the second blade extends, relative to the first engagement portion and engaged with the first blade portion.

7. The printing device according claim 6, wherein the first engagement portion includes a first engagement gear, the second engagement portion includes a second engagement gear, and the first engagement gear and the second engagement gear rotate together by being driven by movement of the first blade portion.

8. A printing device comprising:

a first blade configured to move between a standby position and a cutting position;

a second blade configured to cut a print medium with the first blade;

a blade guide configured to guide movement of the first blade to the cutting position; and a warping prevention portion configured to prevent or reduce warping of the first blade, wherein the first blade is configured to overlap the second blade in a first direction, the blade guide is located in the first direction relative to the second blade, and the warping prevention portion is configured to press the first blade, which is moving to the cutting position, in a second direction opposite to the first direction to prevent or reduce warping of the first blade.

9. The printing device according to claim 8, wherein the warping prevention portion includes an elastic member.

10. The printing device according to claim 9, wherein the first blade has a first blade edge, the second blade has a second blade edge, the blade guide is provided at both end portions of the first blade in a third direction in which the second blade edge of the second blade extends, and presses the first blade, which is moving to the cutting position, in the second direction, the first blade edge of the first blade moving to the cutting position rubs against the second blade edge from both end portions of the first blade edge in the third direction toward a center portion of the first blade edge in the third direction, and a force of the warping prevention portion pressing the first blade positioned at the cutting position is larger than a force of the warping prevention portion pressing the first blade positioned at the standby position.

11. The printing device according to claim 8, wherein the blade guide includes a rib protruding in the first direction.

12. The printing device according to claim 8, further comprising:

a drive pin that the first blade is provided with;

a tubular rotator; and a drive motor configured to rotate the rotator, wherein a side surface of the rotator has a drive groove engaged with the drive pin, and when the rotator rotates with the drive pin engaged with the drive groove, the first blade moves from the standby position to the cutting position.

13. The printing device according to claim 12, further comprising a rotation prevention portion configured to prevent or reduce rotation of the first blade caused by a force in the third direction.

14. The printing device according to claim 13, wherein the rotation prevention portion includes a first engagement gear and a second engagement gear, and the first engagement gear and the second engagement gear rotate together by being driven by movement of the first blade.

* * * * *